US006496363B1

(12) United States Patent
Li (10) Patent No.: US 6,496,363 B1
(45) Date of Patent: Dec. 17, 2002

(54) MOUNTING DEVICE FOR MOUNTING A PERIPHERAL DEVICE ON AN ELECTRONIC APPARATUS

(75) Inventor: Chun-Liang Li, Tainan (TW)

(73) Assignee: Compucase Enterprise Co., Ltd., Tainan (TW)

( * ) Notice: Subject to any disclaimer, the term of this patent is extended or adjusted under 35 U.S.C. 154(b) by 37 days.

(21) Appl. No.: 09/867,310

(22) Filed: May 29, 2001

(51) Int. Cl.⁷ ................................................. G06F 1/16
(52) U.S. Cl. ..................... 361/685; 361/683; 312/223.2; 248/634
(58) Field of Search ................................ 361/685, 825, 361/730, 731, 725, 683; 312/223.1, 223.2; 248/633–638, 618

(56) References Cited

U.S. PATENT DOCUMENTS

| | | | | |
|---|---|---|---|---|
| 5,121,296 A | * | 6/1992 | Hsu | 361/685 |
| 5,135,415 A | * | 8/1992 | Huber | 439/347 |
| 5,192,227 A | * | 3/1993 | Bales et al. | 439/532 |
| 5,694,288 A | * | 12/1997 | Shortt et al. | 200/294 |
| 5,818,696 A | * | 10/1998 | Knoop | 361/685 |
| 5,904,592 A | * | 5/1999 | Baran et al. | 361/627 |
| 6,122,173 A | * | 9/2000 | Felcman et al. | 312/223.1 |
| 6,351,376 B1 | * | 2/2002 | Liang et al. | 361/137 |
| 6,377,449 B1 | * | 4/2002 | Liao et al. | 248/65 |

* cited by examiner

Primary Examiner—Darren Schuberg
Assistant Examiner—Anthony Q. Edwards
(74) Attorney, Agent, or Firm—Trop, Pruner & Hu, P.C.

(57) ABSTRACT

A mounting device for mounting a peripheral device on a casing of an electronic apparatus includes a pair of spaced-apart upright mounting plates, each having a lower edge adapted to be fixed to a base plate of the casing, and each being formed with a mounting recess on one side confronting the other mounting plate. The mounting recess is defined by a pair of upright clamping walls and a connecting wall which interconnects the clamping walls. Each of a pair of anchoring members has an upright engaging wall formed with an engaging projection adapted to engage a respective outer side wall of the casing, and a pair of wing portions extending transversely, from the engaging wall. The anchoring members are inserted respectively into the mounting recesses via open upper ends of the latter, and are clamped between the clamping walls of the respective mounting recess.

6 Claims, 7 Drawing Sheets

MOUNTING DEVICE FOR MOUNTING A PERIPHERAL DEVICE ON AN ELECTRONIC APPARATUS

BACKGROUND OF THE INVENTION

1. Field of the Invention

The present invention relates to a mounting device for mounting a peripheral device on a casing of an electronic apparatus, more particularly to one which facilitates installation and detachment operations of the peripheral device to and from the electronic apparatus.

2. Description of the Related Art

Figure 1:
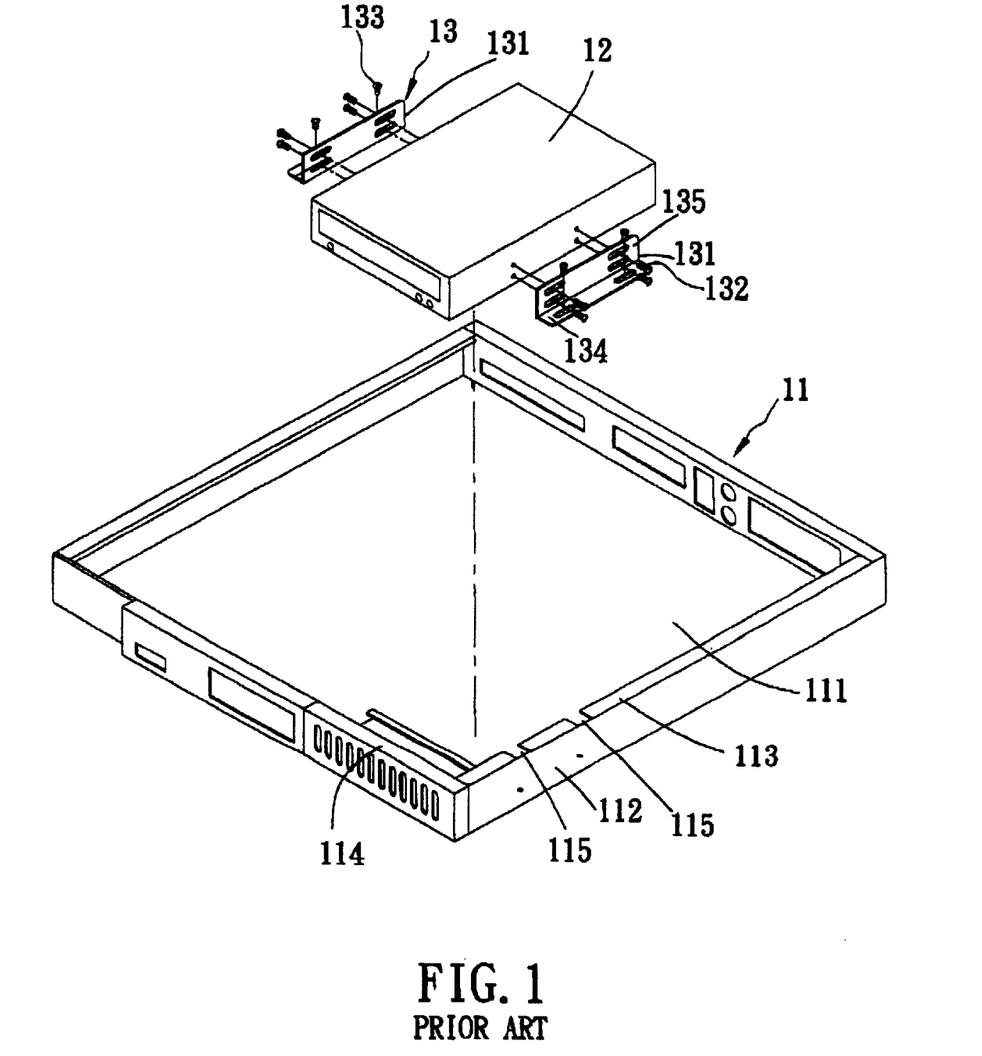
FIG. 1 is an exploded perspective view illustrating how a peripheral device is mounted on a casing of an electronic apparatus using a conventional mounting unit.
Figure 2:
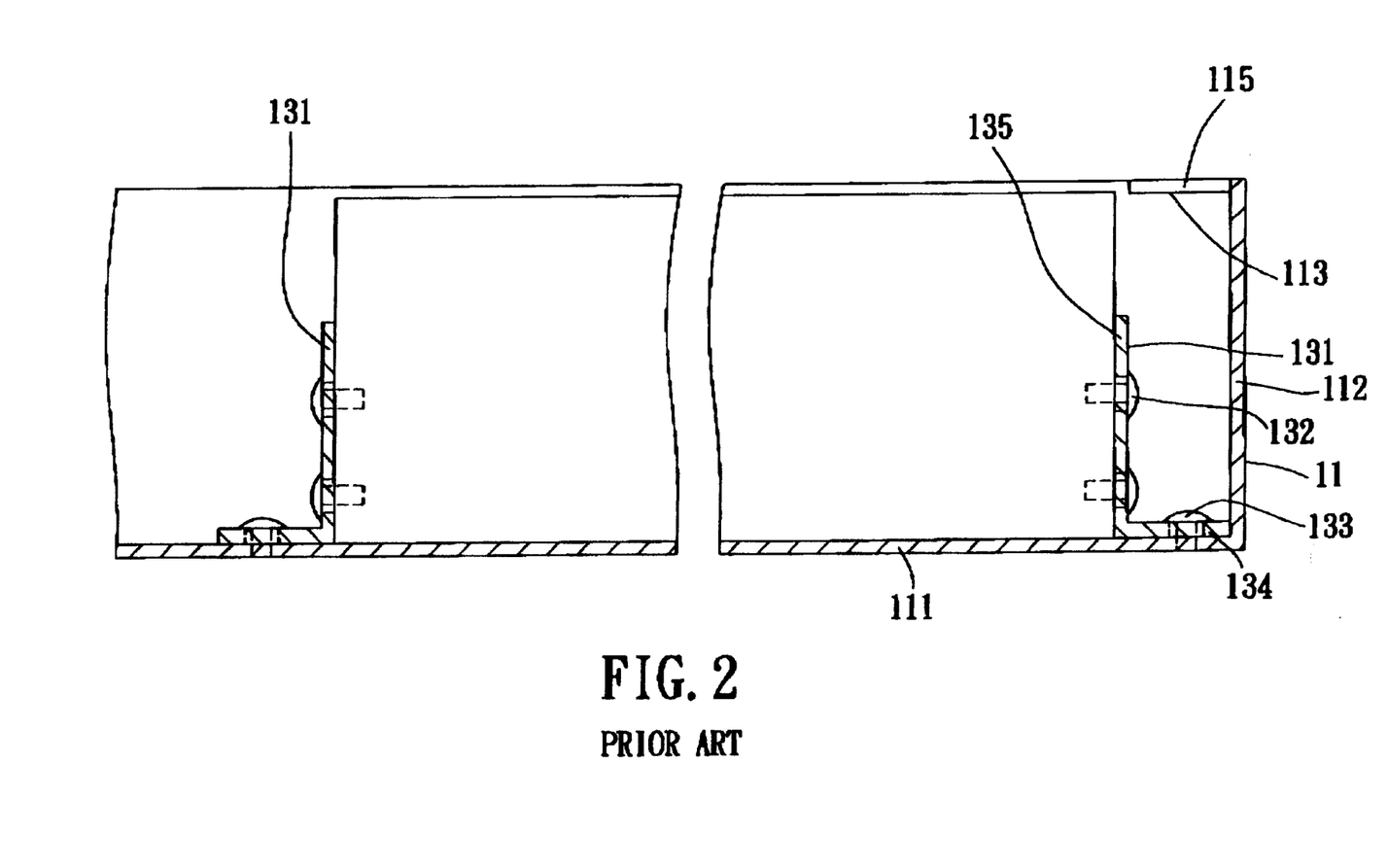
FIG. 2 is a fragmentary sectional view illustrating the connection between the peripheral device and the casing of the electronic apparatus using the conventional mounting unit.

An electronic apparatus is typically installed with a peripheral device, such as a hard disk drive, a floppy disk drive, or a CD-ROM drive, which is connected electrically to a central processing unit (CPU) of the electronic apparatus for providing desired data storage and/or retrieval functions. Referring to FIGS. 1 and 2, conventionally, the peripheral device 12 is mounted within a casing 11 of the electronic apparatus using a mounting unit 13 which includes a pair of L-shaped mounting plates 131, and a plurality of screw fasteners 132, 133. The casing 11 includes a horizontal base wall 111, and a rectangular surrounding wall 112 which extends upwardly from the base wall 111 and which is formed with a horizontal top flange 113 that extends horizontally toward an interior of the casing 11. Each of the mounting plates 131 includes a vertical plate portion 135 for attaching to a respective outer side wall of the peripheral device 12, and a horizontal plate portion 134 for attaching to the base wall 111 of the casing 11. A first set of the screw fasteners 132 extends through the vertical plate portions 135 of the mounting plates 131 and into the outer side walls of the peripheral device 12 for fastening the mounting plates 131 to the peripheral device 12. A second set of the screw fasteners 133 extends through the horizontal plate portions 134 of the mounting plates 131 and into the base wall 111 of the casing 11 for fastening the mounting plates 131 to the casing 11, thereby mounting the peripheral device 12 on the base wall 111. The peripheral device 12 is typically disposed adjacent to one side of the surrounding wall 112. The casing 11 is mounted with a front cap 114 at the surrounding wall 112 to permit access to the peripheral device 12. The top flange 113 of the surrounding wall 112 on said one side adjacent to the peripheral device 12 is formed with notches 115 to permit extension of a tool therethrough for operating the screw fasteners 133.

Since the screw fasteners 132, 133 are relatively small and need to be operated one at a time using the tool, installation and detachment of the peripheral device 12 to and from the electronic apparatus are labor and time consuming.

SUMMARY OF THE INVENTION

Therefore, the main object of the present invention is to provide a mounting device which facilitates installation and detachment operations of a peripheral device to and from a casing of an electronic apparatus.

Accordingly, the mounting device of the present invention includes a parallel pair of upright mounting plates, and a pair of anchoring members. Each of the mounting plates has a lower edge adapted to be fixed to a base plate of the casing, and a mounting side which confronts the other one of the mounting plates and which is formed with a mounting recess with an open upper end. The mounting recess is defined by a pair of upright clamping walls which are opposite to each other and which extend transverse to a longitudinal direction of the mounting plate, and a connecting wall which extends parallel to the longitudinal direction of the mounting plate and which interconnects the clamping walls. Each of the anchoring members has an upright engaging wall with two opposite vertical edges, and a pair of wing portions extending transversely from the vertical edges of the engaging wall. The engaging wall is formed with an engaging projection which projects in a direction opposite to the wing portions and which is adapted to extend into and engage a respective one of two opposite outer side walls of the peripheral device. The anchoring members are inserted respectively into the mounting recesses via the open upper ends. Each of the wing portions of the anchoring members engages a respective one of the clamping walls in the mounting recesses of the mounting plates such that each of the anchoring members is clamped between the clamping walls of the mounting recess of the respective one of the mounting plates.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
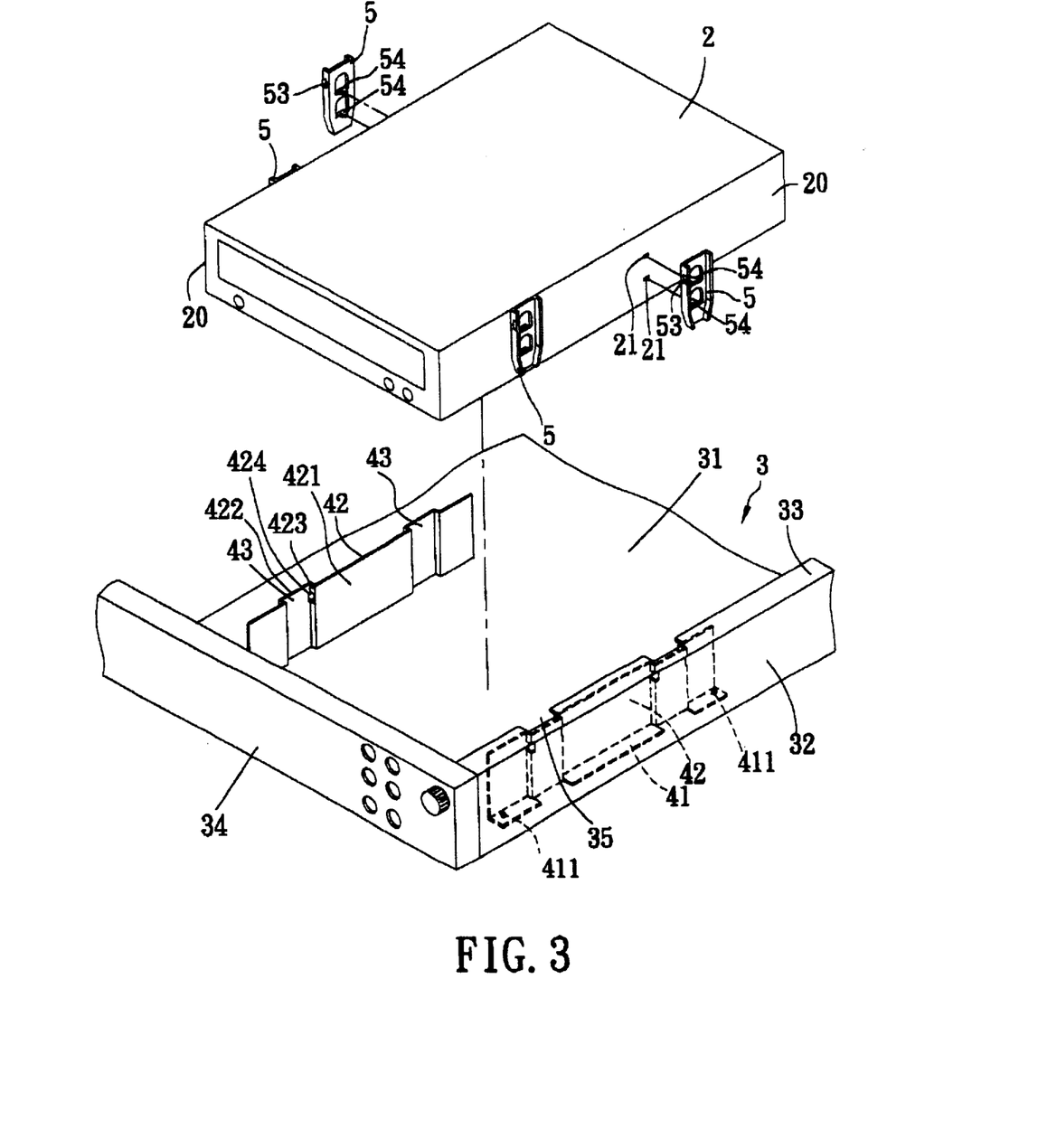
FIG. 3 is an exploded perspective view of a first preferred embodiment of a mounting device of the present invention when used for mounting a peripheral device in a casing of an electronic apparatus.
Figure 4:
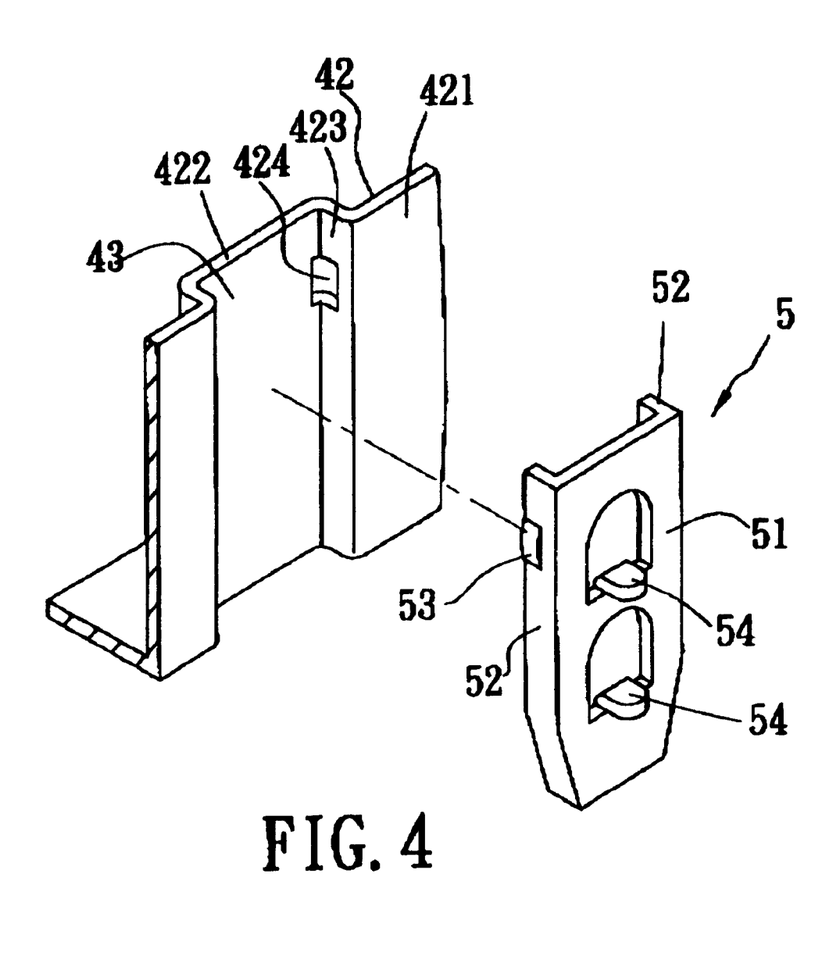
FIG. 4 is an exploded perspective view of the first preferred embodiment, illustrating a mounting plate and an anchoring member of the first preferred embodiment.

Referring to FIGS. 3 and 4, the first preferred embodiment of the mounting device according to the present invention is used for mounting a peripheral device 2 on a casing 3 of an electronic apparatus. The peripheral device 2 may be a data storage device, such as floppy disk drive, a hard disk drive, a CD-ROM drive, etc., and can be in electrical connection with a central processing unit (CPU) of the electronic apparatus to provide the electronic apparatus with desired data storage and/or retrieval functions. The electronic apparatus is typically a computer, such as an industrial computer. The casing 3 has a horizontal base wall 31, and a surrounding wall 32 extending upwardly from a periphery of the base wall 31. The surrounding wall 32 has a top flange 33 that extends horizontally and inwardly toward a central part of the casing 3. The casing 3 further has a front cap 34 connected to the surrounding wall 32 to permit access to the peripheral device 2 after the latter is mounted on the casing 31. The top flange 33 is formed with two notches 35. The peripheral device 2 has two opposite outer side walls 20, each of which is formed with two pairs of engaging holes 21.

The mounting device of the present embodiment includes a pair of upright mounting plates 42 and two pairs of anchoring members 5.

The mounting plates 42 are parallel with and are spaced-apart from each other. Each of the mounting plates 42 has an L-shaped cross-section, and a horizontal bottom flange 41 adapted to a to side of the base wall 31 of the casing 3. The bottom flange 41 is adapted to be secured to the base wall 31 using screw fasteners or rivets 411. Alternatively, the mounting plates 42 may be welded to the base wall 31 of the casing 3. In this case, the bottom flange 41 may be omitted or reduced in size. Each of the mounting plates 42 has a mounting side 421 confronting the other one of the mounting plates 42 and formed with two vertically extending mounting recesses 43 which have open upper ends. Each of the mounting recesses 43 is defined by a parallel pair of upright clamping walls 423 which are opposite to each other and which extend transverse to a longitudinal direction of the respective mounting plate 42, and a connecting wall 422 which extends parallel to the longitudinal direction of the respective mounting plate 42 and which interconnects the clamping walls 423. The clamping walls 423 and the connecting wall 422 cooperatively form a U-shaped configuration. Each of the clamping walls 423 is formed with a retaining slot 424.

Each pair of the anchoring members 5 is adapted to be attached to a respective one of the outer side walls 20 of the peripheral device 2. Each of the anchoring members 5 has a U-shaped cross-section, and includes an engaging wall 51 with two opposite vertical edges, and a pair of wing portions 52 extending transversely and respectively from the opposite vertical edges of the engaging wall 51. The engaging wall 51 is adapted to be attached to the respective one of the outer side walls 20 of the peripheral device 2, and is formed with a pair of engaging projections 54 that project horizontally in a direction opposite to the wing portions 52 and that are spaced-apart in a vertical direction. The engaging projections 54 are adapted to be inserted into and engage the engaging holes 21 in the respective outer side wall 20 of the peripheral device 2. Each of the wing portions 52 has an outer surface opposite to the other one of the wing portions 52 and formed with a resilient retaining protrusion 53. The anchoring members 5 are inserted downwardly and respectively into the mounting recesses 43 in the mounting plates 42 via the open upper ends of the mounting recesses 43 to enable the retaining protrusions 53 on the wing portions 52 to extend into and engage the retaining slots 424 in the clamping walls 423 of the mounting recesses 43.

Figure 5:
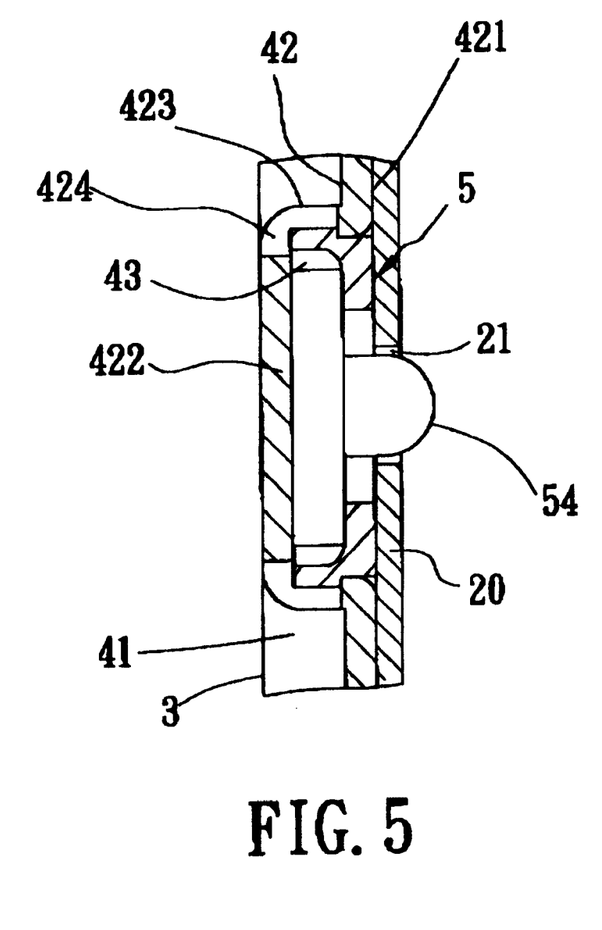
FIG. 5 is a fragmentary sectional top view of the first preferred embodiment.

Referring to FIGS. 3 and 5, to use the mounting device of the present embodiment for mounting the peripheral device 2 on the casing 3 of the electronic apparatus, firstly, the mounting pieces 42 are secured to the base wall 31 of the casing 3 using screw fasteners or rivets or by welding, and the anchoring members 5 are attached to the outer surface walls 20 of the peripheral device 2 by inserting the engaging projections 54 into the engaging holes 21. Thereafter, the assembly of the anchoring members 5 and the peripheral device 2 is brought above the base wall 31 and is moved downwardly toward a space between the mounting plates 31 to enable insertion of the anchoring members 5 into the mounting recesses 43, respectively, via the open upper ends of the latter. At this time, the wing portions 42 of each of the anchoring members 5 are clamped between the clamping walls 423 of a respective one of the mounting recesses 43. The retaining protrusions 53 on the anchoring members 5 extend into the retaining slots 424 in the mounting recesses 43 and engage the retaining slots 424. The mounting sides 421 of the mounting plates 42 abut against the outer side walls 20 of the peripheral device 2, and cooperate to limit and position the peripheral device 2 between the mounting plates 42. In this manner, horizontal movement of the peripheral device 2 on the base plate 31 is prevented.

In another embodiment, each of the mounting plates 42 may be formed with only one mounting recess 43. The number of the anchoring members 5 corresponds to the number of the mounting recesses 43 formed in the mounting plates 4. In addition, each of the wing portions 52 on the anchoring members 5 may be formed with upper and lower retaining protrusions 53. In this case, each clamping wall 423 in the mounting recesses 43 of the mounting plates 42 should be formed with upper and lower retaining slots 424 for engaging the upper and lower retaining protrusions 53. Moreover, the engaging wall 51 of each of the anchoring members 5 may be formed with only one engaging protection 54.

Figure 6:
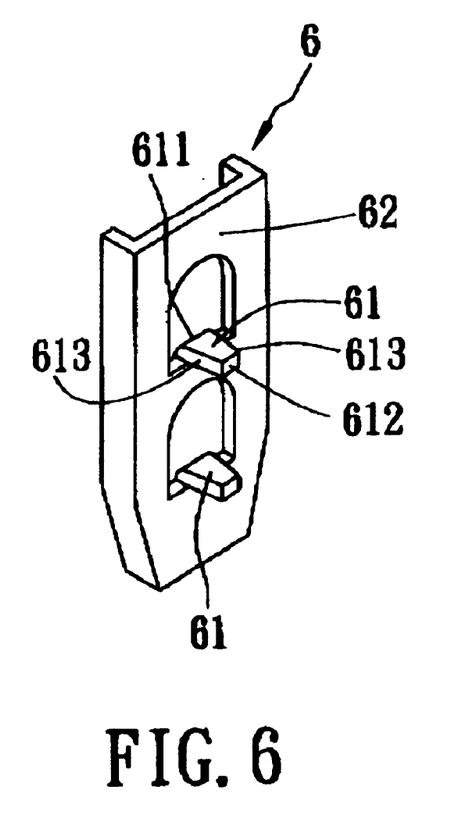
FIG. 6 is a perspective view of an anchoring member of a mounting device of the second preferred embodiment of the present invention.

Referring to FIG. 6, in the second preferred embodiment of the mounting device according to the present invention, each of the engaging projections 61 on the anchoring members 6 is trapezoidal in shape, and converges gradually in a direction away from the engaging wall 62 of the respective anchoring member 6. The engaging projection 61 has a wider connecting end 611 connected to the engaging wall 62, a narrower distal end 612 distal to the engaging wall 62, and two opposite inclined edges 613 extending between the connecting end 611 and the distal end 612. The inclined edges 613 engage frictionally opposite parts of a hole defining wall that defines a respective engaging hole 21 in the outer side walls 20 of the peripheral device 2 (see FIG. 3) when the engaging projection 61 is inserted into the respective engaging hole 21.

Figure 7:
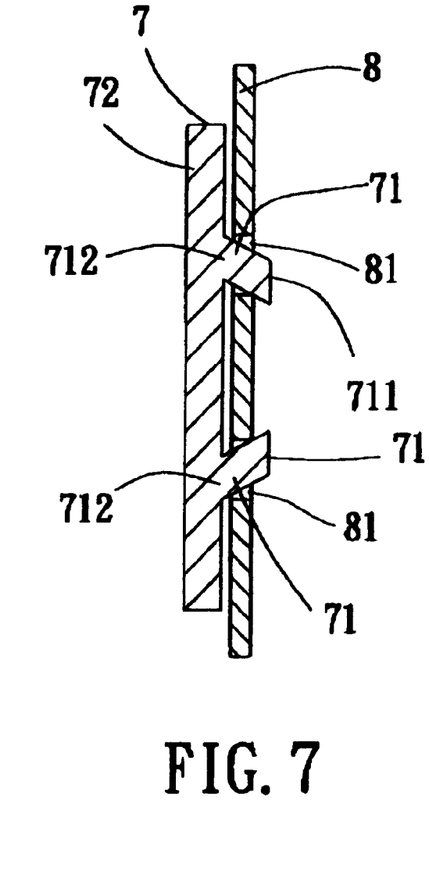
FIG. 7 is a schematic fragmentary sectional view illustrating an anchoring member of a mounting device of the third preferred embodiment of the present invention.

Referring to FIG. 7, in the third preferred embodiment of the mounting device according to the present invention, the engaging projections 71 on the anchoring members 7 are spaced-apart in a vertical direction, as with the previous embodiment, but are inclined relative to a horizontal plane and extend toward each other. Each of the engaging projections 71 has a connecting end 712 connected integrally to the engaging wall 72 of the respective anchoring member 7, and a distal end 711 opposite to the connecting end 712. The engaging projections 71 extend toward each other such that a distance between the distal ends 711 is smaller than a distance between the connecting ends 712. As shown, the engaging projections 71 are adapted to extend through engaging holes 81 in a respective outer side wall 8 of the peripheral device, and cooperate to clamp the outer side wall 8 between the engaging projections 71 and the engaging wall 72 of the respective anchoring member 7.

Figure 8:
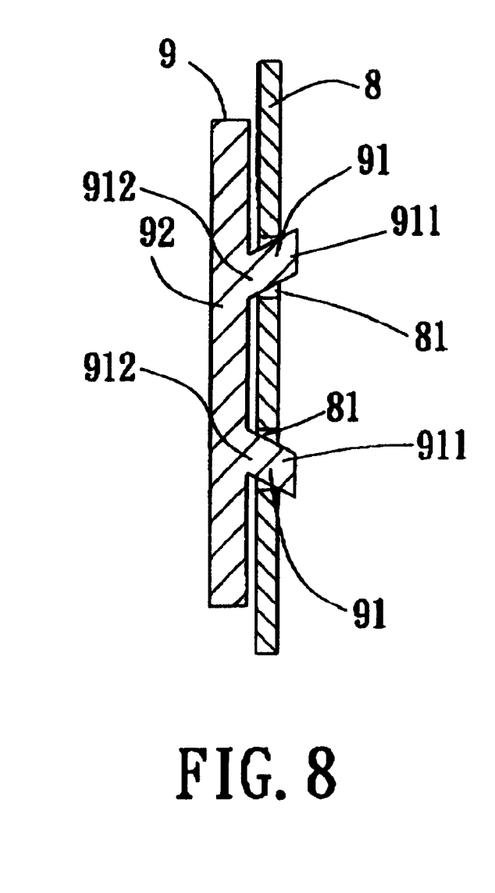
FIG. 8 is a schematic fragmentary sectional view illustrating an anchoring member of a mounting device of the fourth preferred embodiment of the present invention.

Referring to FIG. 8, in the fourth preferred embodiment of the mounting device of the present invention, the engaging projections 91 on the anchoring members 9 are spaced-apart in a vertical direction and are inclined relative to a horizontal plane, as with the previous embodiment, but extend away from each other such that a distance between the distal ends 911 is larger than a distance between the connecting ends 912. Likewise, the engaging projections 91 are adapted to extend through the engaging holes 81 in a respective outer side wall 8 of the peripheral device, and cooperate to clamp the outer side wall 8 between the engaging projections 91 and the engaging wall 92 of the respective anchoring member 9.

With the use of the mounting device of the present invention, installation of the peripheral device 2 to the casing 3 of the electronic apparatus can be easily conducted. Moreover, the detachment operation is also simplified. In the first preferred embodiment shown in FIG. 3, by simply holding the peripheral device 2 and forcing the peripheral device 2 to move upwardly away from the base wall 31 of the casing 3, the anchoring members 5 can be removed from the mounting recesses 43 to detach the peripheral device 2 from the casing 3 of the electronic apparatus.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A mounting device for mounting a peripheral device on a casing of an electronic apparatus, the casing having a horizontal base plate, the peripheral device having a pair of upright outer side walls opposite to each other, said mounting device comprising:

a pair of spaced-apart upright mounting plates, each of which has a lower edge adapted to be fixed to the base plate of the casing, and a mounting side which confronts the other one of said mounting plates and which is formed with a mounting recess with an open upper end, said mounting recess being defined by a pair of upright clamping walls which are opposite to each other and which extend transverse to a longitudinal direction of said mounting plate, and a connecting wall which extends parallel to said longitudinal direction of said mounting plate and which interconnects said clamping walls; and a pair of anchoring members, each of which has an upright engaging wall with two opposite vertical edges, and a pair of wing portions extending transversely from said vertical edges of said engaging wall, said engaging wall being formed with an engaging projection which projects in a direction opposite to said wing portions and which is adapted to extend into and engage a respective one of the outer side walls of the peripheral device, said anchoring members being inserted respectively into said mounting recesses via said open upper ends, each of said wing portions engaging a respective one of said clamping walls in said mounting recesses of said mounting plates such that each of said anchoring members is clamped between said clamping walls of said mounting recess of the respective one of said mounting plates.

2. The mounting device as claimed in claim 1, wherein each of said clamping walls of said mounting plates is formed with a retaining slot, each of said wing portions of said anchoring members being formed with a retaining protrusion for engaging said retaining slot.

3. The mounting device as claimed in claim 1, wherein said engaging projection on said engaging wall of each of said anchoring members is trapezoidal in shape, and has a wider connecting end connected integrally to said engaging wall and a narrower distal end distal to said engaging wall.

4. The mounting device as claimed in claim 1, wherein said engaging wall of each of said anchoring members is formed with a pair of said engaging projections which are spaced apart from each other.

5. The mounting device as claimed in claim 4, wherein each of said engaging projections has a connecting end connected integrally to said engaging wall, and a distal end distal to said engaging wall, said engaging projections extending away from each other such that a distance between said distal ends of said engaging projections is larger than a distance between said connecting ends of said engaging projections.

6. The mounting device as claimed in claim 4, wherein each of said engaging projections has a connecting end connected integrally to said engaging wall, and a distal end distal to said engaging wall, said engaging projections extending toward each other such that a distance between said distal ends of said engaging projections is smaller than a distance between said connecting ends of said engaging projections.

* * * * *